US011568426B2

(12) United States Patent
Klemm et al.

(10) Patent No.: US 11,568,426 B2
(45) Date of Patent: Jan. 31, 2023

(54) SHARING VIRTUAL BUSINESS VENUES AND FEEDBACK WITH SOCIAL CONNECTIONS

(71) Applicant: Avaya Inc., Santa Clara, CA (US)

(72) Inventors: Reinhard Klemm, Basking Ridge, NJ (US); David Skiba, Golden, CO (US)

(73) Assignee: Avaya Inc., Santa Clara, CA (US)

( * ) Notice: Subject to any disclaimer, the term of this patent is extended or adjusted under 35 U.S.C. 154(b) by 2092 days.

(21) Appl. No.: 14/951,224

(22) Filed: Nov. 24, 2015

(65) Prior Publication Data

US 2017/0148036 A1 May 25, 2017

(51) Int. Cl.
G06Q 30/02 (2012.01)
G06Q 50/00 (2012.01)
H04M 3/51 (2006.01)

(52) U.S. Cl.
CPC ......... G06Q 30/0201 (2013.01); G06Q 50/01 (2013.01); H04M 3/5166 (2013.01); H04M 2203/655 (2013.01)

(58) Field of Classification Search
None
See application file for complete search history.

(56) References Cited

U.S. PATENT DOCUMENTS

| 8,634,543 | B2 | 1/2014 | Flockhart et al. |
| 8,761,377 | B2 | 6/2014 | Famous |
| 8,879,697 | B2 | 11/2014 | Klemm et al. |
| 2009/0276279 | A1* | 11/2009 | Quesnel ............... G06Q 30/016 705/7.29 |
| 2010/0235218 | A1 | 9/2010 | Erhart et al. |
| 2010/0296417 | A1 | 11/2010 | Steiner |
| 2011/0125697 | A1 | 5/2011 | Erhart et al. |
| 2011/0125793 | A1 | 5/2011 | Erhart et al. |
| 2011/0125826 | A1 | 5/2011 | Erhart et al. |
| 2012/0195422 | A1* | 8/2012 | Famous ............... H04M 3/5232 379/265.09 |
| 2013/0065569 | A1* | 3/2013 | Leipzig ................... H04W 4/16 455/416 |

(Continued)

OTHER PUBLICATIONS

A. Acharya, J. Manweiler, S. Sharma and N. Banerjee, "Presence based open contact center leveraging social networks," 2013 IFIP/IEEE International Symposium on Integrated Network Management (IM 2013), 2013, pp. 990-1003. (Year: 2013).*

Primary Examiner — Mehmet Yesildag
(74) Attorney, Agent, or Firm — Sheridan Ross P.C.

(57) ABSTRACT

Associating callers of a contact center with their social media identity may provide mutual benefits to the caller and contact center. For example, a business operating a contact center can receive information about their current and potential customers and customers can receive additional information, incentives, or other perks by allowing access to their social media profile. When a caller initially calls a contact center, they are prompted, and possibly incentivized, to check into a virtual venue. The caller may then be known, via an associated social media identity, to the contact center. The virtual venue may then receive access to comments and other posts, such as endorsements, provided by connects to the social media identity and process the call in accordance with the sentiment or utilize the social media network for post-call follow-up.

20 Claims, 5 Drawing Sheets

(56) References Cited

U.S. PATENT DOCUMENTS

| | | | |
|---|---|---|---|
| 2014/0046725 A1* | 2/2014 | Brandt | G06Q 30/0203 |
| | | | 705/7.32 |
| 2014/0059126 A1 | 2/2014 | Klemm et al. | |
| 2014/0081636 A1* | 3/2014 | Erhart | G06Q 50/01 |
| | | | 704/236 |
| 2014/0237057 A1* | 8/2014 | Khodorenko | H04L 51/32 |
| | | | 709/206 |
| 2014/0237467 A1* | 8/2014 | Heddleston | G06Q 50/01 |
| | | | 717/176 |
| 2014/0359008 A1 | 12/2014 | Finney | |
| 2015/0055772 A1 | 2/2015 | Klemm et al. | |
| 2015/0178652 A1* | 6/2015 | Schulz | G06Q 10/06315 |
| | | | 705/7.25 |
| 2015/0245184 A1* | 8/2015 | Govande | H04W 4/16 |
| | | | 455/417 |
| 2015/0324863 A1* | 11/2015 | Pugh | G06Q 30/0226 |
| | | | 705/14.27 |
| 2016/0134633 A1* | 5/2016 | Gaddam | G06Q 50/01 |
| | | | 726/4 |

* cited by examiner

SHARING VIRTUAL BUSINESS VENUES AND FEEDBACK WITH SOCIAL CONNECTIONS

FIELD OF THE DISCLOSURE

The present disclosure is generally directed toward associating a node of a first network with a node on a second network.

BACKGROUND

Contact centers and the companies they support have an interest in acquiring as much context as possible about the individuals calling the contact center. The caller context can aid in call routing, issue resolution, on-call marketing, and beyond. One valuable source of caller context is social media because a caller's social media activity and profiles provide insights into the caller's persona (e.g., name, age, gender, education, interests, hobbies, etc.) as well as the caller's potential value to the business. For example, a caller who posts about their experiences with flights on various airlines on social media reveals a lot about their travel frequency, destinations, and preferences, thus providing valuable insights to an airline. The value of this information is particularly high if this caller is not yet known to the called business.

SUMMARY

It is with respect to the above issues and other problems that the embodiments presented herein were contemplated. In one embodiment, systems and methods are provided that solve the above problems and other issues by providing a check-in via a virtual venue and monitoring social media after check-in to determine a caller/customer's sentiment, reactions, and questions.

In one embodiment, a system is provided to allow a customer calling a business's contact center to "check in" with the business on a social network (e.g., Foursquare, Facebook, Google+, Twitter, etc.) while on the call. The check-in mirrors a social customer check-in as if the business were a physical venue. Prior to the check-in, the system asks the customer to log into a social network of their choice or, alternatively, a social network selected by the business. The business has a configured "virtual venue" for its contact center or, if supported by the social network, a virtual venue for the tuple (contact center, this customer). If the latter is enabled, the business can create or allocate a customized venue for each customer based on the customer's social network profile, which is adjusted for any demographic, including, but not limited to, language, location, age, gender, etc. The virtual venue being visible to, and optionally accept participation (e.g., posting, endorsements, etc.) from the customer's social media connections.

The social network login can be accomplished through various means depending on how the call to the contact center is established. The login process can be part of an interactive voice response (IVR) tree or the simplified one-click login mechanism, which is supported by many social networks. If the call is established via a click-to-call mechanism or other application that sets up the call, the one-click login mechanism can be made part of the call establishment process.

If the customer checks into the virtual venue, the check-in will appear in the customer's social media feed. The proposed system may then begin tracking the reactions of the customer's social connections and other users to the check-in posting. A micro-demographic, comprising the customer and the customer's social media connections may then be formed. The micro-demographic may raise issues, provide sentiment, or other information of value to a business. The system retrieves these reactions and automatically analyzes them to generate insights into the users' sentiments, as determined by and/or extrapolated from the micro-demographic, towards the business, frequently mentioned issues/questions, etc. Check-ins tend to draw the attention of other users and elicit comments from such users. These comments may be helpful in allowing the business to understand customers' perceptions of their level of customer service and products.

In another embodiment, the system allows the customer to conveniently post an assessment of the business and/or its service on the social network by providing a response to a voice menu, such as at the end of the call. In another embodiment, a speech recognition interface is provided that allows the customer to speak an evaluation. In such embodiments, the system would post the customer's assessment to the customer's social media feed. As with the posted check-in, the system begins tracking the feedback on the assessment post from the customer's social connections for an automated analysis of users' sentiments towards the business, frequently mentioned issues/questions, etc.

A customer service check-in provides an easy vehicle for follow-up, status, and feedback in a public location specific to the user and/or situation. This may be used as an additional option for a status update, further questions, and/or a launching point for other interactions regarding the specific service event. The customer service check-in is designed to place these features into the communication modality preferred by the customer. For customers that are active on social media and customers who leverage the channel using mobile, web, and other forms, the system may be more timely and convenient than other follow-up methods.

In one embodiment, a server is disclosed, comprising: a communication interface to a network; a processor to: access a communication from a customer from the network; prompt the customer to check into a virtual venue associated with a contact center on a social media network; associate the customer with a social media identity utilized to check into the virtual venue; monitor the social media identity for content associated with the social media identity; and determine a sentiment based upon sentiment from ones of the content associated with the social media identity.

In another embodiment, a method is disclosed, comprising: accessing a communication from a customer on a network; prompting the customer to check into a virtual venue associated with a contact center on a social media network; associating the customer with a social media identity utilized to check into the virtual venue; monitoring the social media identity for content associated with the social media identity; and determining a sentiment based upon sentiment from ones of the monitored content associated with the social media identity.

In another embodiment, a means for accessing a social media identity of a caller is disclosed, comprising: means to access a communication from a customer on a network; means to prompt the customer to check into a virtual venue associated with a contact center on a social media network; means to associate the customer with a social media identity utilized to check into the virtual venue; means to monitor the social media identity for content associated with the social media identity; and means to determine a sentiment based upon sentiment from ones of the monitored content associated with the social media identity.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium," as used herein, refers to any tangible storage that participates in providing instructions to a processor for execution. Such a medium may take many forms, including, but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, an EPROM, a FLASH-EPROM, a solid-state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation, or technique.

The term "module," as used herein, refers to any known or later-developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices that may be shown in block diagram form, and are well known or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
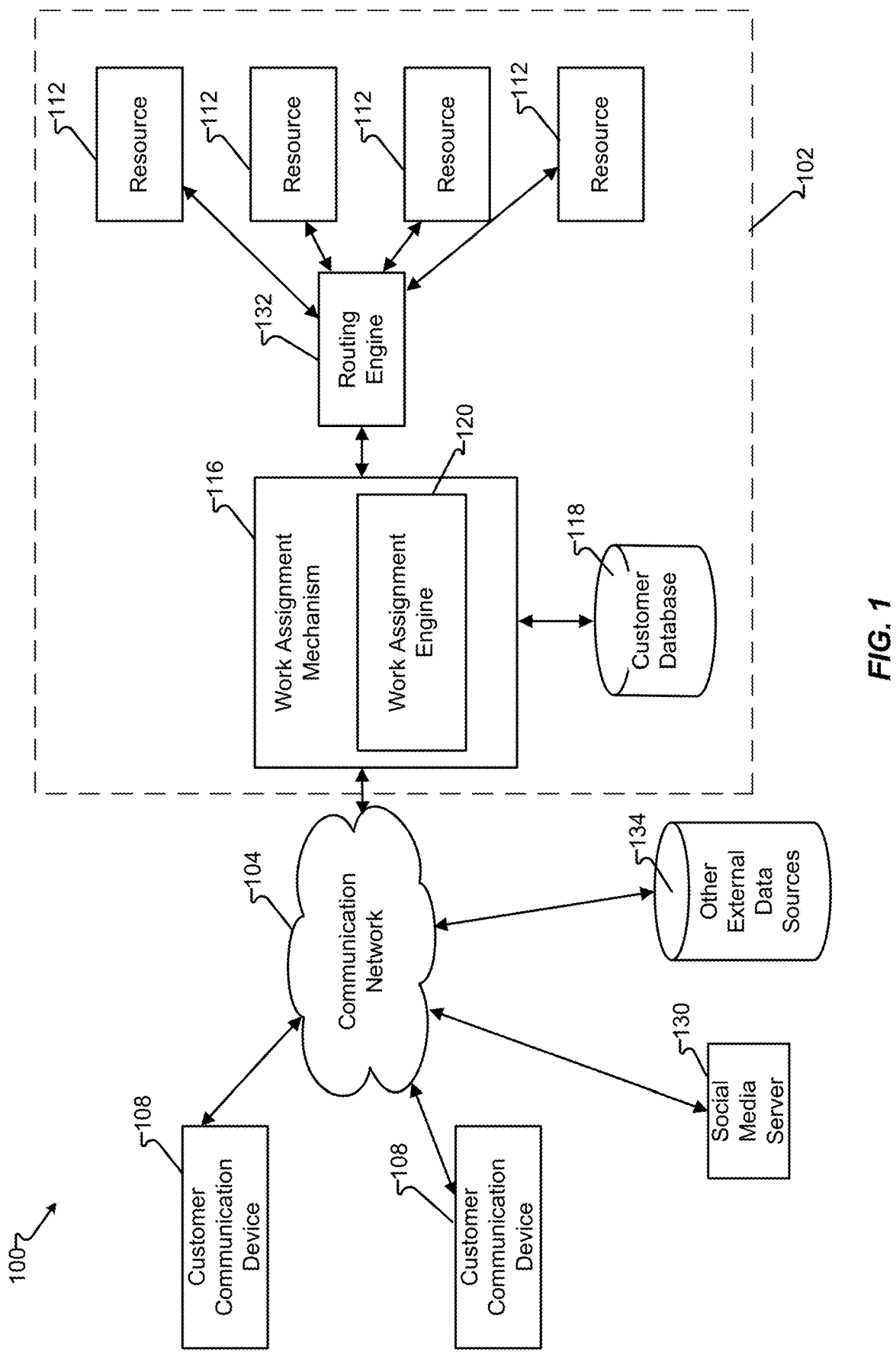
FIG. 1 depicts a first system in accordance with embodiments of the present disclosure.

With reference now to FIG. 1, communication system 100 is discussed in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering contact center 102 in which a plurality of resources 112 is distributed to handle incoming work items (in the form of contacts) from customer communication devices 108.

Contact center 102 is variously embodied to receive and/or send messages that are or are associated with work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 118, and/or other component may connect to routing engine 132 via communication network 112, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134 may be within contact center 102 physically and/or logically, but still be considered external for other purposes. For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., WiFi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media website 130 and/or other external data sources 134 may be utilized to provide one means for a resource 112 to receive and/or retrieve contacts and connect to a customer of a contact center 102. Other external data sources 134 may include data sources, such as service bureaus, third-party data providers (e.g., credit agencies, public and/or private records, etc.). Customers may utilize their respective customer communication device 108 to send/receive communications utilizing social media server 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively, each of which is hereby incorporated herein by reference in its entirety.

The format of the work item may depend upon the capabilities of the communication device 108 and the format of the communication. In particular, work items are logical representations within a contact center 102 of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication at which point the work assignment mechanism 116 passes the work item to a routing engine 132 to connect the communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general, each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage elements may be dedicated to the operator of contact center 102 or shared or distributed amongst a plurality of service provider customers, one being contact center 102.

In one embodiment, a message is generated by customer communication device 108 and received, via communication network 104, at work assignment mechanism 116. The message received by a contact center 102, such as at the work assignment mechanism 116, is generally, and herein, referred to as a "contact." Routing engine 132 routes the contact to at least one of resources 112 for processing.

Figure 2:
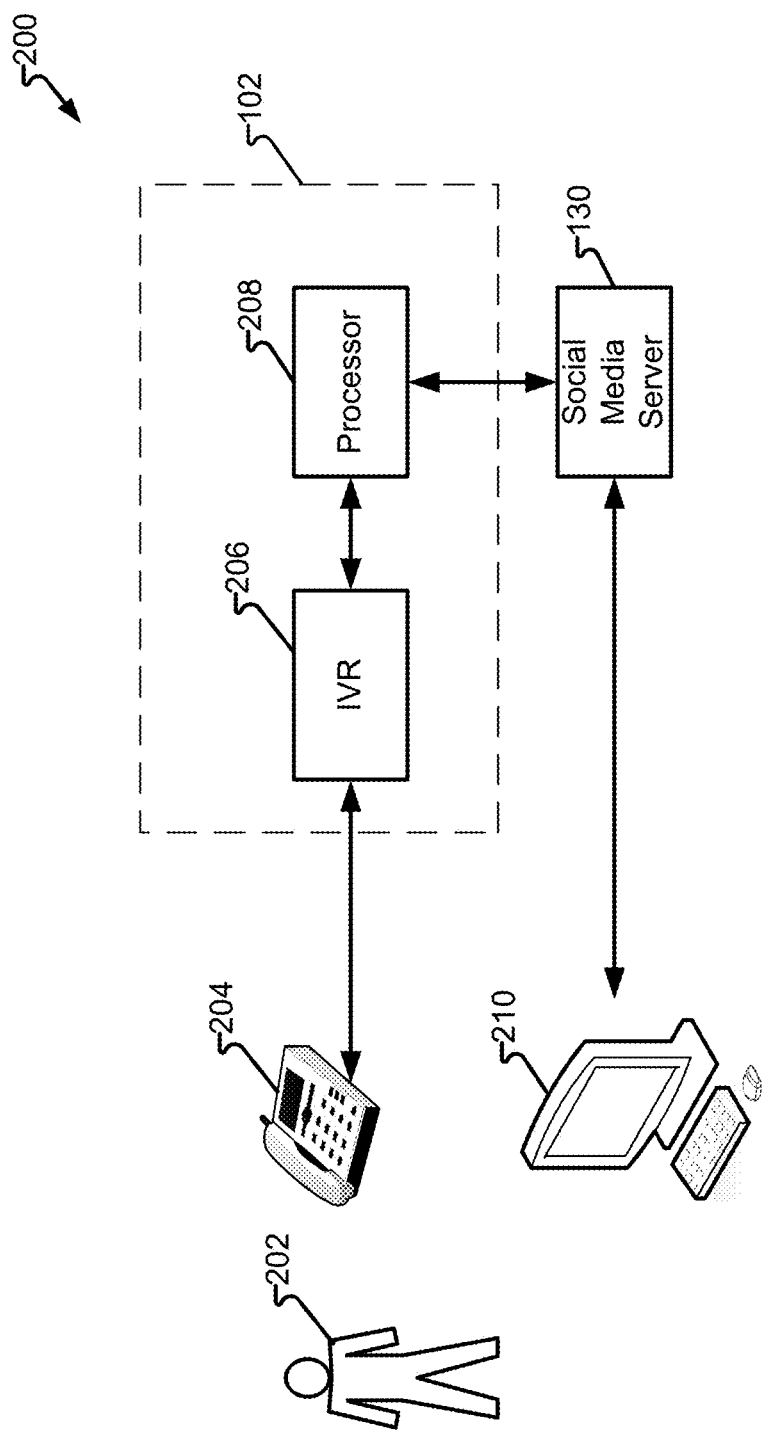
FIG. 2 depicts a second system in accordance with embodiments of the present disclosure.

FIG. 2 depicts system 200 in accordance with embodiments of the present disclosure. In one embodiment, customer 202 initiates a communication with contact center 102 utilizing customer communication device 204. Customer 202 also has access to an Internet connected computer 210. It should be appreciated that customer communication device 204, such as a telephone, and computer 210 may be embodied as the same device or, as illustrated, as distinct devices. Accordingly, as an aid to clarity, customer communication device 204 and computer 210 are illustrated as distinct devices as one embodiment and for the promotion of clarity and understanding of other embodiments. Similarly, contact center 102 is illustrated in a more simplified form for the further promotion of clarity and to avoid unnecessarily complicating the figure.

Customer 202 is initially connected to IVR 206, such as to ascertain information that may be useful to resolve a particular issue for which customer 202 has initiated the communication and/or to maintain the communication until such time as a human agent (one of resources 112) becomes available. It should be appreciated that customer 202 utilizes a voice communication device 204 to interact with IVR 206 as one embodiment. In other embodiments, customer 202 utilizes a different communication device 204, such as a computer, texting device, text chat, audio chat, video chat, and/or other communication device wherein IVR 206 accommodates the communication medium. For example IVR 206 may be embodied as an automated text and/or email response component providing IVR-type functionality in a text-based format. Similarly, IVR 206 may be embodied as an avatar or other automated video response device.

In another embodiment, processor 208 and/or IVR 206 provide a prompt to customer 202 to check into a virtual venue on a social media server, such as social media server 130. The virtual venue may be associated with the plurality of customers, allocated from a pool of available virtual venues, or created specifically for customer 202. If customer 202 refuses to perform the check-in operation, the communication may be processed in a manner similar to that known in the prior art, such as waiting for the next available agent. If customer 202, such as by utilizing Internet connected computer 210, performs the check-in operation with the virtual venue associated with social media server 130, processor 208 may then associate a social media identity associated with customer 202 with the party associated with the communication via customer communication device 204.

In another embodiment, processor 208 may monitor social media server 130 and the virtual venue. Connections to customer 202 on social media server 130 (e.g., Facebook friends, Twitter followers, LinkedIn connections, etc.) may comment or provide other content associated with customer 202 checking in to the virtual venue. As a benefit, processor 208 and contact center 102 may ascertain information related to sentiment, strengths, weaknesses, and other perception issues associated with a micro-demographic comprising customer 202 and/or social media connections to customer 202.

In a further embodiment, the virtual venue may be utilized for a merging of service and/or marketing activities for the micro-demographic comprising customer 202 and/or social media connections to customer 202. For example, a business may post a message on a virtual venue to reach all members of the micro-demographic. Similarly, a FAQ or other support avenue may reference the virtual venue, such as to address similar issues raised by customer 202.

The virtual venue may be variously embodied. In one embodiment, the virtual venue is similar to a physical venue but without geographic limitations. The virtual venue may be specifically customized for customer 202, such as by accessing interest, demographics, and/or other information associated with the social media identity of customer 202 on social media server 130 and/or by accessing other information, such as information associated with a prior call and/or business, which may be maintained in customer database 118 (see FIG. 1). The virtual venue may be created or allocated specifically for customer 202 or shared with the plurality of customers. IVR 206 may then prompt customer 202 to check into the specific virtual venue ("Please go to socialmedia.com and check into 'Alpha Airlines Support Lounge 91'") whether or not shared with other customers. The virtual venue, even when created or allocated specifically for customer 202, remains accessible to connections of customer 202.

By utilizing a unique virtual venue, a social media identifier checking into the unique virtual venue may then be readily identified as associated with customer 202. However, if the virtual venue is shared, additional information may be required, such as by IVR 206 prompting customer 202 to provide their social media identifier, which they utilized to access the virtual venue on social media server 130.

Figure 3:
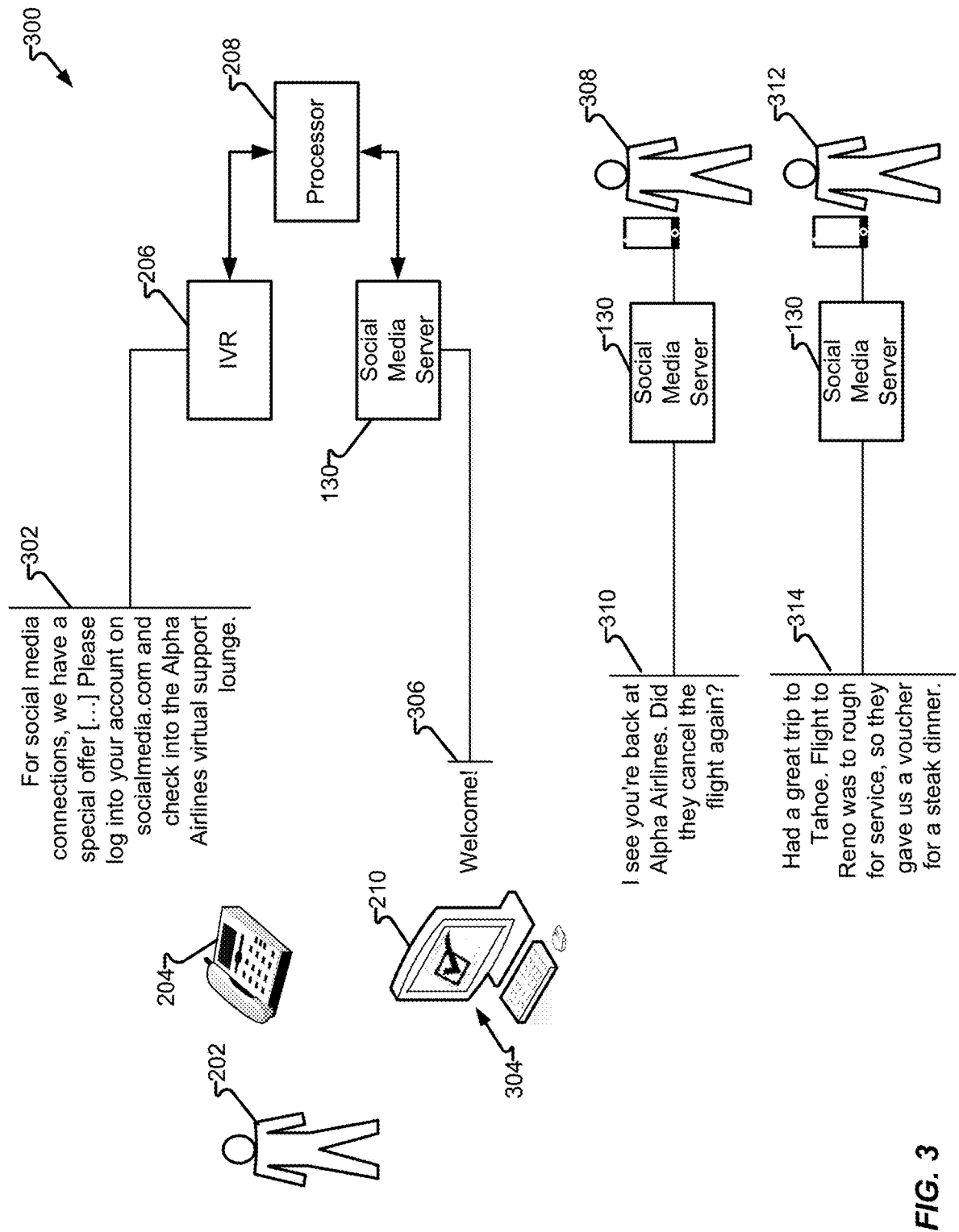
FIG. 3 depicts a first interaction in accordance with embodiments of the present disclosure.

FIG. 3 depicts interaction 300 in accordance with embodiments of the present disclosure. In one embodiment, interaction 300 begins with IVR 206 providing prompt 302 to customer 202 utilizing customer device 204, such as a voice telephone. Prompt 302 may provide information identifying the virtual venue and, if necessary, the particular social media website hosting the virtual venue.

In another embodiment, processor 208 may monitor social media server 130, such as by receiving push notifications and/or pulling updates. Social media server 130 may detect the customer 202 utilizing Internet connected computer 210 has performed check-in operation 304. In response, social media server 130 may provide welcome notification 306. Optionally, IVR 206 may also or alternatively provide confirmation of check-in operation 304 via customer communication device 204. After the check-in, customer 202 is known to contact center 102 and processor 208 via social media server 130. Processor 208 may then monitor social media server 130 content provided by connections 308, 312 to customer 202 on social media server 130.

In one embodiment, connection 308 provides content 310 on social media server 130. Connection 312 similarly provides content 314 on social media server 130. The sentiment provided by content 310, 314 may then be monitored by processor 208. Content may be determined by key words, phrases, emojis, endorsements of prior content, and/or other means to express sentiment or agreement/disagreement with a prior sentiment-containing content.

In another embodiment, processor 208 may modify an interaction with customer 202 utilizing communication device 204 communication. For example, content 310, 314 and/or other content may have a negative sentiment. As a result, processor 204 may cause the communication with customer 202 utilizing communication device 204 to be routed to a more skilled agent and/or provide a script, whisper message, pop-up, and/or other message indicating to the agent the presence of the negative sentiment and/or suggesting actions to take to mitigate the negative sentiment. For example, processor 208 may instruct an agent to offer a greater discount or refund in an effort to mitigate negative sentiment by customer 202 and/or one or more connections of customer 202 on social media server 130.

Figure 4:
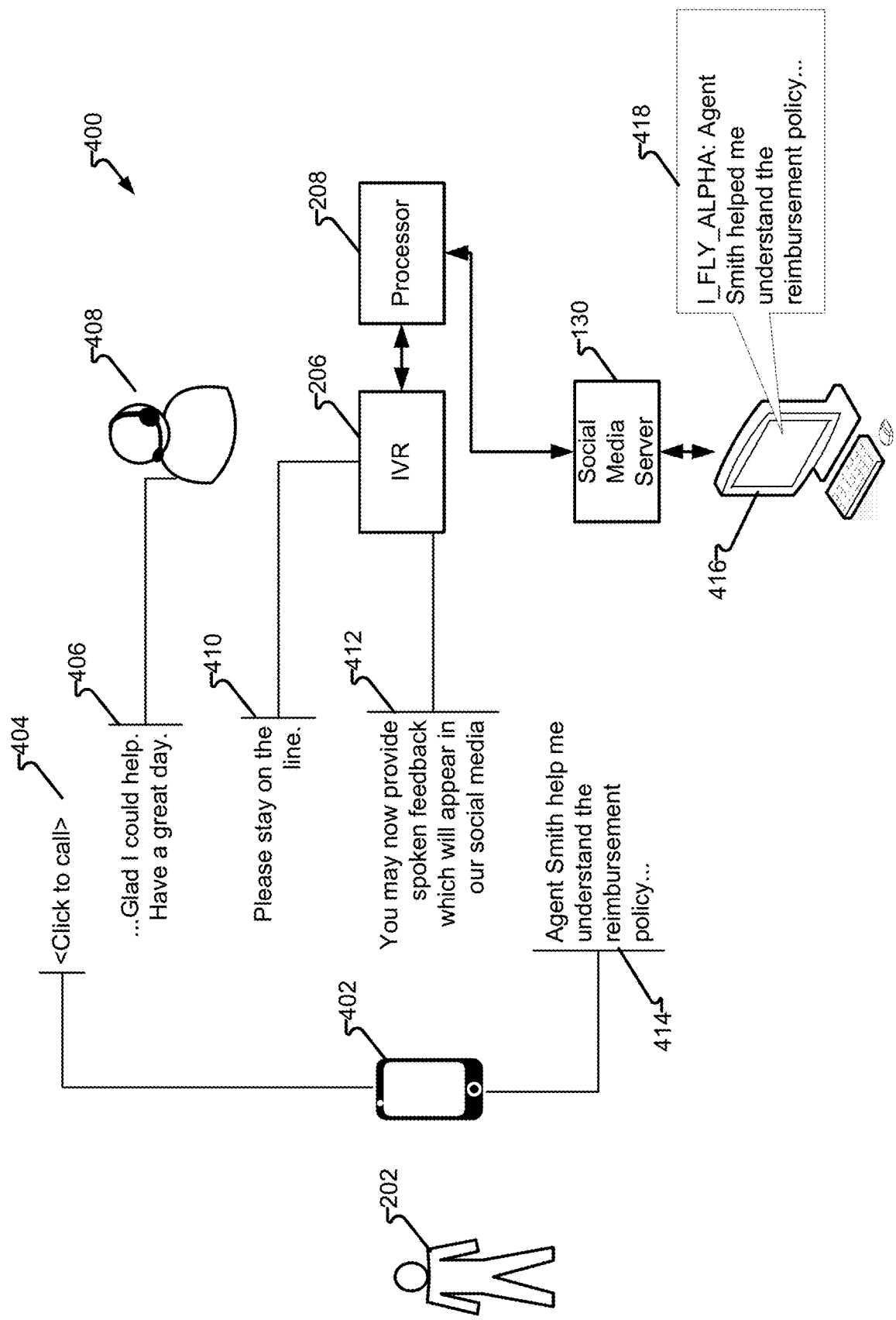
FIG. 4 depicts a second interaction in accordance with embodiments of the present disclosure.

FIG. 4 depicts interaction 400 in accordance with embodiments of the present disclosure. Interaction 400 may begin with customer 202 utilizing customer communication device 402 to initiate a communication with a contact center, such as contact center 102. Customer 202 may utilize communication device 402, such as a smart phone, to access a webpage or other portal having a click-to-call function, wherein interaction 404 is initiated with the click-to-call 404 feature.

Customer 202 and agent 408 are then connected and establish a communication, including dialogue 406, which may represent the conclusion of the interaction in the communication with agent 408. Agent 408 and/or IVR 206 may provide prompt 410 indicating that customer 202 is requested to remain with the communication. Prompt 412 is provided, such as by IVR 206 providing customer 202 with the opportunity to provide feedback on a social media website and optionally a particular virtual venue. Customer 202 utilizing customer device 402 then provides feedback 414 to IVR 206 for transcription by processor 208 and posting on social media server 130. As a result, the user of computer 416 connected to social media server 130 may then see transcribed content 418, such as a text form of the spoken content provided by customer 202 during feedback 414.

In another embodiment, click-to-call feature 404 may also become or be associated with a "connect to virtual venue" feature. As a benefit, customer 202 utilizing internet-enabled customer communication device 402 may access their presence on a social media server, such as a social media server 130, and may even perform the check-in function to the virtual venue established by contact center 102.

In another embodiment, processor 208 may continue to monitor social media server 130 to determine sentiment provided by connections to customer 202 on social media server 130. As a further embodiment, content provided by customer 202 may also be monitored to determine sentiment as well as to optionally determine if or when a follow-up may be performed. The follow-up may be performed via social media server 130 and the social media identity provided by customer 202 to access the virtual venue associated with social media server 130 and/or other means, such as a telephone number.

Figure 5:
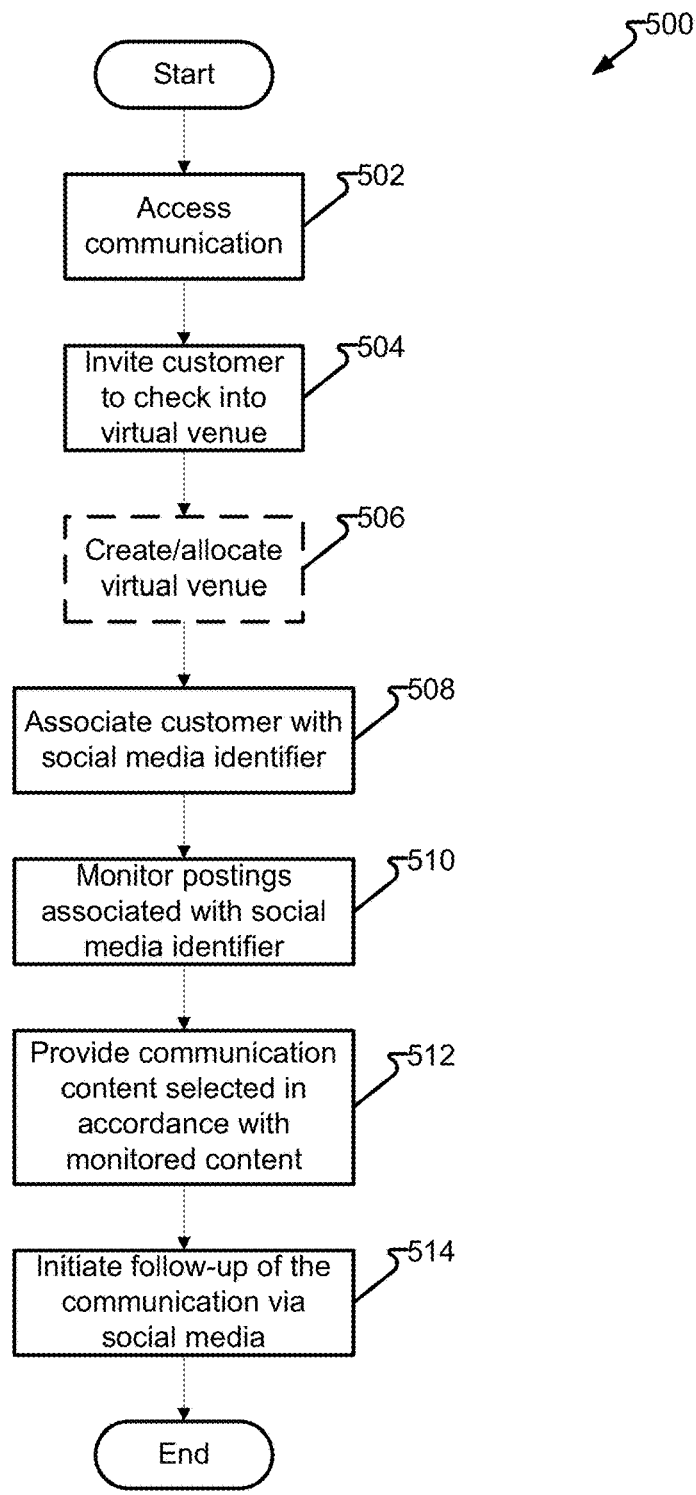
FIG. 5 depicts a process in accordance with embodiments of the present disclosure.

FIG. 5 depicts process 500 in accordance with embodiments of the present disclosure. In one embodiment, process 500 begins with step 502 accessing a communication. The communication may be voice-only, text, audio-video, and/or other format. The communication may be initiated by a user, such as customer 202, or a contact center, such as contact center 102. Step 504 invites the customer to check into virtual venue on a social media website. Optionally, step 506 may be performed to create and/or allocate the virtual venue, which may be further restricted to a single customer, such as customer 202, or shared with a plurality of customers interacting with the contact center. However the virtual venue remains accessible (e.g., viewing, posting, endorsing, etc.) by connections of customer 202. Step 508 associates the customer of the communication with the social media identity utilized to check into the virtual venue. If, after performing step 506 a unique virtual venue is allocated solely to one customer, then a social media identity utilized to check into that virtual venue may then be associated with the customer.

In another embodiment, the virtual venue may comprise a social media element selected in accordance with attributes associated with the customer, such as attributes gleaned from the customer's identity on the social media server, such as social media server 130. For example the customer may be known to have a particular hobby, interest, tastes, gender, age, etc. in the virtual venue may then be configured to provide social media elements such as would be appropriate for the attributes of the customer. For example, social media server 130 in the virtual venue may provide sports stories, travel updates, news, games, and/or other items, which may be of interest to the customer.

Next, step 510 may then monitor postings associated with a social media identifier. The postings may be provided by the social media identifier itself and/or connections to the social media identifier. Step 510 may determine a sentiment or particular elements of interest associated with a customer from the content provided. For example, a connection to the customer may indicate an interest of the customer relevant to the contact center ("I see you checked into Alpha Airlines. Are you finally booking your trip to Italy?"). The contact center (e.g., an airline) may then prepare an agent to address a potential international booking. Sentiment may also be determined both in terms of the customer and the connection to the customer, which may be of value to determine how non-customers view the contact center. For example, when a connection may post a negative message, which then may be endorsed by other connections.

Step 512 may then process the communication in accordance with the monitored social media content. For example, step 512 may route the communication to an agent qualified to perform international flight booking. In another example, step 512 may route a communication to an agent skilled in mitigating negative sentiment or to an agent skilled in leveraging positive sentiment. Step 514 may optionally be performed to initiate a communication via the social media identity and/or other communication path (e.g., telephone number utilized for the communication) for the customer. Step 514 may comprise a prompt for the customer, while still engaged in a communication with the contact center, to provide content (e.g. spoken, text) to be provided on the social media server. Step 514 may also comprise a triggering event to follow up at a future time, such as to ascertain the need for further action, ensure customer satisfaction, and/or other customer service function.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU), or logic circuits programmed with the instructions to perform the methods (FPGA). These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

While illustrative embodiments of the disclosure have been described in detail herein, it is to be understood that the inventive concepts may be otherwise variously embodied and employed and that the appended claims are intended to be construed to include such variations, except as limited by the prior art.

What is claimed is:

1. A server, comprising: a communication interface to a network; and a processor to: access a communication using a customer communication device, utilized by a customer, via the network; within the communication, prompt the customer to check into a virtual venue associated with a contact center on a social media network; associate the customer with a social media identity utilized to check into the virtual venue; monitor the social media network for content associated with the social media identity; determine a sentiment from sentiment associated with the content associated with the social media identity; select an agent having a skill associated with the sentiment; and cause the communication to be routed by a routing engine to a communication device associated with the agent.

2. The server of claim 1, wherein the processor monitors the social media network for the content associated with the social media identity, further comprising, monitoring the content provided by social media connections of the social media identity on the social media network.

3. The server of claim 1, wherein the processor monitors the social media network for the content associated with the social media identity, further comprising, monitoring a post provided by the social media identity comprising a sentiment and endorsements provided by social media connections of the social media identity on the social media network.

4. The server of claim 1, wherein indicia of the sentiment is provided to the communication device associated with the agent during the communication between the agent and the customer.

5. The server of claim 1, wherein the processor modifies an agent script in accordance with the sentiment and provides the modified agent script to the communication device associated with the agent during the communication between the agent and the customer.

6. The server of claim 1, wherein the processor creates a follow-up event wherein the communication device associated with the selected agent reconnects with the social media identity at a future time to determine a customer's satisfaction with the communication.

7. The server of claim 6, wherein the agent is an automated agent.

8. The server of claim 1, wherein the processor provides a prompt to the customer within the communication and receives a response to the prompt from the customer as a post on the social media network.

9. The server of claim 8, wherein the processor utilizes speech-to-text instructions to transcribe the response into a textual format for posting on the social media network.

10. The server of claim 1, wherein the processor creates a follow-up event wherein the communication device associated with the agent connects with at least one social media connection of the social media identity at a future time.

11. The server of claim 1, wherein the virtual venue is provided, in response to a signal from the processor, solely for access by the social media identity and a number of devices of the contact center, comprising the communication device associated with the agent.

12. The server of claim 11, wherein the virtual venue comprises social media elements selected, by the processor, in accordance with demographic attributes of at least one of the customer or the social media identity.

13. A method, comprising: accessing a communication using a customer communication device, utilized by a customer, via a network; within the communication, prompting the customer to check into a virtual venue associated with a contact center on a social media network; associating the customer with a social media identity utilized to check into the virtual venue; monitoring the social media network for content associated with the social media identity; determining a sentiment from sentiment associated with the content associated with the social media identity; selecting an agent having a skill associated with the sentiment; and causing the communication to be routed by a routing engine to a communication device associated with the agent.

14. The method of claim 13, wherein the virtual venue is allocated solely to the social media identity and a number of devices of the contact center, comprising the communication device associated with the agent.

15. The method of claim 13, further comprising performing a follow-up event wherein the communication device associated with the selected agent reconnects with the customer via the social media network.

16. The method of claim 15, wherein the follow-up event further comprises a follow-up within the virtual venue.

17. A system for routing communications, comprising: means to access a communication using a customer communication device, utilized by a customer, via a network; means to, within the communication, prompt the customer to check into a virtual venue associated with a contact center on a social media network; means to associate the customer with a social media identity utilized to check into the virtual venue; means to monitor the social media network for content associated with the social media identity; means to determine a sentiment from sentiment associated with the content associated with the social media identity; means to select an agent having a skill associated with the sentiment; and means to cause the communication to be routed by a routing engine to a communication device associated with the agent.

18. The system of claim 17, wherein the virtual venue is allocated solely to the social media identity and a number of devices of the contact center, comprising the communication device associated with the agent.

19. The system of claim 17, wherein the means to monitor the content associated with the social media identity, further comprise, means to monitor endorsements provided by social media connections of the social media identity on the social media network, the endorsements being associated with a post provided by the social media identity and further comprising a sentiment of the post.

20. The system of claim 17, further comprising means to provide the sentiment to the communication device associated with the agent for use during a communication between the agent and the customer.

* * * * *